United States Patent [19]

Posso

[11] Patent Number: 4,986,415
[45] Date of Patent: Jan. 22, 1991

[54] BOX FOR THE STORAGE, DISPLAY AND SELECTION OF DISKETTES OR OTHER MAGNETIC MEMBERS

[75] Inventor: Patrick P. Posso, Lausanne, Switzerland

[73] Assignee: Posso S.A., Paris, France

[21] Appl. No.: 781,526

[22] Filed: Sep. 30, 1985

[30] Foreign Application Priority Data

Oct. 1, 1984 [FR] France .................. 84 15063

[51] Int. Cl.$^5$ ............................................. B65D 5/52
[52] U.S. Cl. .................. 206/45.23; 206/45.13; 206/45.18; 206/45.2; 206/444
[58] Field of Search .............. 206/45.14, 45.18, 45.2, 206/45.23, 425, 444, 45.13, 45.15, , 425, 472; 220/335, 338, 340, 343

[56] References Cited

U.S. PATENT DOCUMENTS

| | | | |
|---|---|---|---|
| 116,506 | 6/1871 | Smith | 206/45.18 |
| 1,930,347 | 10/1933 | Meyer et al. | 206/45.23 |
| 2,304,758 | 12/1942 | Botham | 206/45.13 |
| 2,466,346 | 4/1949 | Young | 206/45.23 |
| 2,675,911 | 4/1954 | Thurston | 206/45.13 |
| 2,680,443 | 6/1954 | Schade | 220/343 |
| 3,360,116 | 12/1967 | Somers et al. | 206/45.2 |
| 4,242,820 | 1/1981 | Ackeret . | |
| 4,255,038 | 9/1980 | Egly | 206/45.18 |
| 4,356,918 | 11/1982 | Kahle et al. | 206/444 |
| 4,368,817 | 1/1983 | Temesvary . | |
| 4,401,216 | 8/1983 | Koch . | |
| 4,413,726 | 11/1983 | Davidson | 206/45.13 |
| 4,428,482 | 1/1984 | Ogawa | 220/340 |
| 4,449,628 | 5/1984 | Egly et al. | 206/45.18 |
| 4,479,577 | 10/1984 | Eichner et al. | 206/444 |
| 4,496,050 | 1/1985 | Kirchner et al. | 206/45.15 |
| 4,508,217 | 4/1985 | Long et al. | 206/45.18 |
| 4,541,527 | 9/1985 | Nagel | 206/425 |
| 4,546,898 | 10/1985 | Ekuan | 206/444 |

FOREIGN PATENT DOCUMENTS

| | | |
|---|---|---|
| 0001353 | 4/1979 | European Pat. Off. . |
| 2307172 | 11/1976 | France . |
| 8201810 | 6/1982 | PCT Int'l Appl. . |
| 1462438 | 1/1977 | United Kingdom . |
| 2091219 | 7/1982 | United Kingdom . |
| 2132588 | 7/1984 | United Kingdom . |

*Primary Examiner*—David T. Fidei
*Attorney, Agent, or Firm*—Hoffman, Wasson & Gitler

[57] ABSTRACT

A box for the storage, display and selection of diskettes or other magnetic members comprising a body defined by a base, a pair of side walls, a back part and a back upper part, together defining a receptacle for receiving diskettes or other magnetic members. The box is provided with a lid including a front upper part, a pair of side walls and a frontal part. The back upper part of the body and the front upper part of the lid are joined together by a continuous integral hinge. The side walls of the body and the of the lid are in mutual overlapping relation. The lid is adapted to be held in an open position by resting the lid on the body such that, in the open position, the lid is tilted back to form an obtuse angle with respect to the base of the body or the upper edges of its side walls.

3 Claims, 3 Drawing Sheets

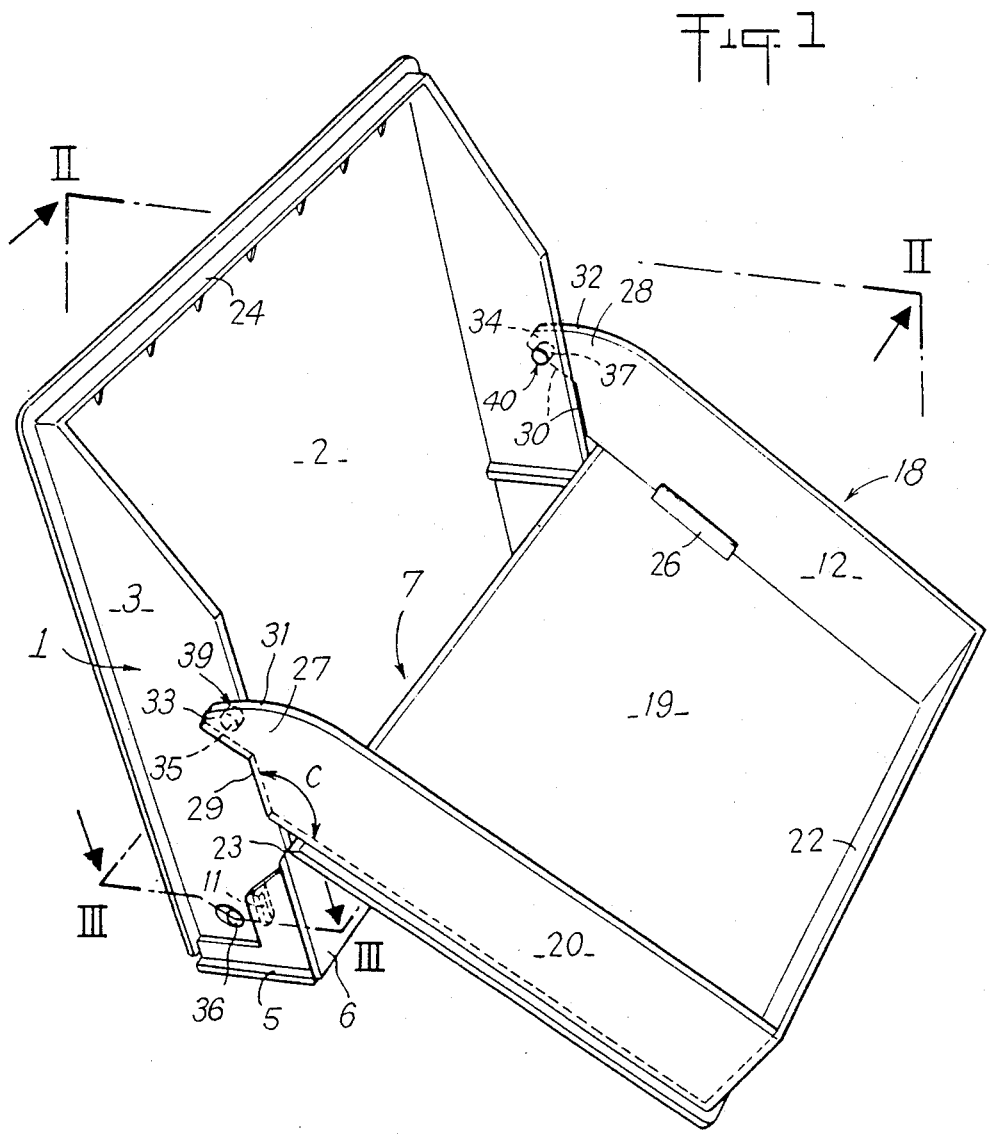

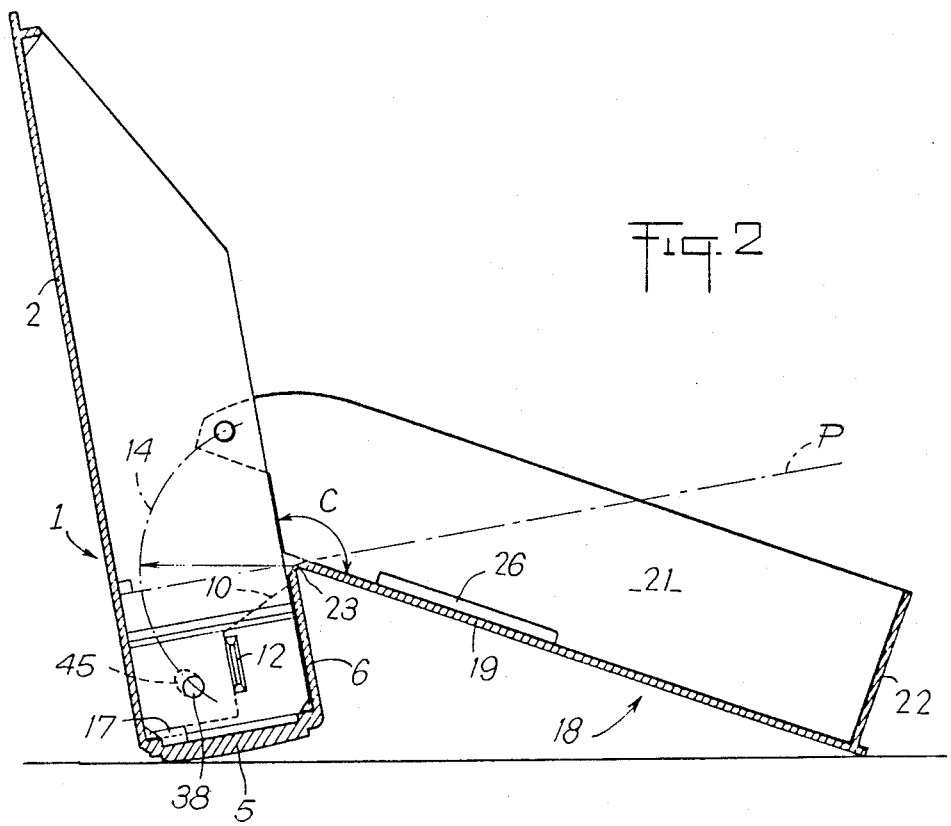
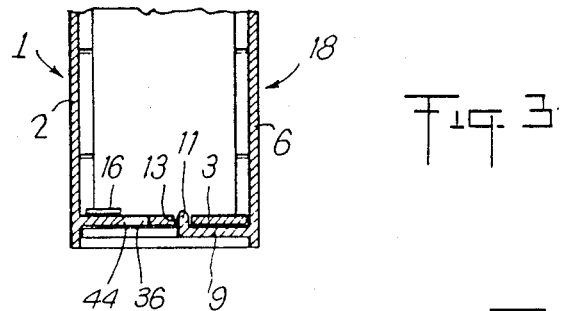
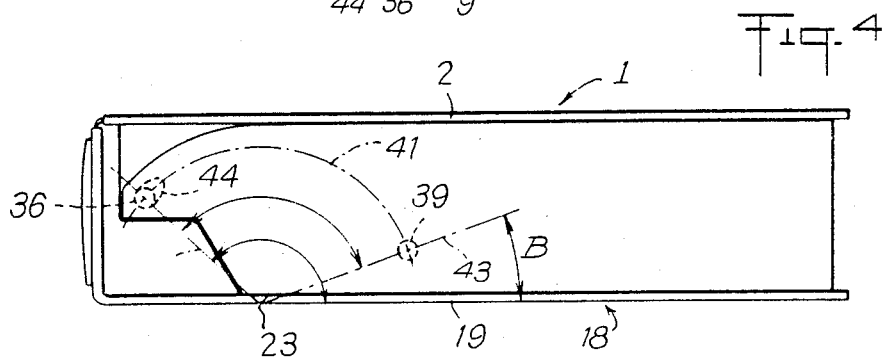

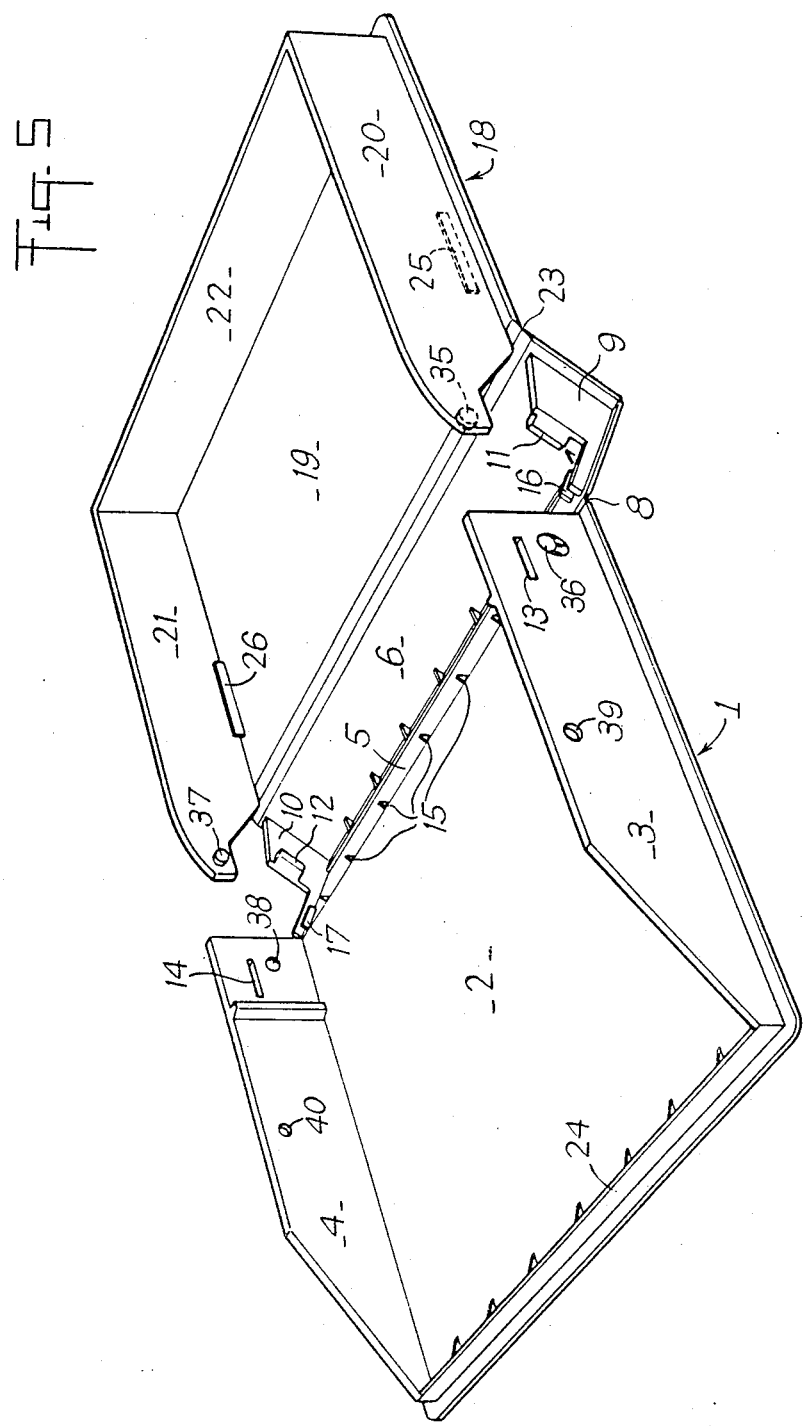

BOX FOR THE STORAGE, DISPLAY AND SELECTION OF DISKETTES OR OTHER MAGNETIC MEMBERS

BACKGROUND OF THE INVENTION

1. Field of the Invention

The present invention relates o a box for the storage of magnetic members such as diskettes, cards or the like. In general, said members are used in a memory control means such as disk-reading apparatus, typewriter with word processor, etc.

2. Description of the Prior Art

The box in which these members are stored has to be tight in order to protect them against dusts or other external agents liable to damage the magnetic data. It should also be so designed as to present the members in the best possible way for identification and to help selection, all of which operations are performed when the box is opened and with most of the members in it. Finally, said box should be produced for the lowest price possible.

French patent application No. 2 498 357 U.S. Pat. No. 4,449,628 describes a box for storing diskettes. Said box comprises a body constituted by a base, side walls and a front part. It further comprises a lid constituted by a top part, side walls, a back part and bracket means defining between them a receptacle for the diskettes, said bracket means being notched so as to present access clearances at the top, on the sides and in the middle. The body and lids are in molded plastics and form a monolithic assembly since the back of the lid is joined to the bottom of the body via a continuous hinge formed in molding. Moreover, the bracket means are secured to the sides of the lid via lug pieces engaging into notches and said lid sides are joined to the sides of the body via means permitting a restriction of the opening of the lid and is immobilization in that position. When the box is open, the base of the body rests on the desk and the lid is inclined forward in order to give access to the receptacle defined by said lid and by the bracket means on which the diskettes are then resting.

The drawback with this box is that identification and selection of the diskettes are relatively uneasy, so much so that the user is tempted to take them all out and to replace those that he does not need. This results in a waste of time, with a risk for the diskettes to be damaged and unnecessary irritation for the staff. In addition, the box is relatively expensive, because of the bracket means, although this can be molded substantially flat owing to a continuous hinge between the top and back of the lid.

French Pat. No. 2,456,671 U.S. Pat. No. 4,314,637 describes a box for the packing of a magnetic cassette. Said box comprises a body constituted by a base, side walls, a back part, and a rear upper part, all of which define a receptacle for housing diskettes. Said box further comprises a lid constituted by a front upper part, side walls and a frontal part. The body and lid are in molded plastics and are joined together so as to form a monolithic assembly which can nevertheless be opened seeing that the rear upper part of the body and the front upper part of the lid are joined together by a continuous hinge formed by molding.

Said box, however, has no means of determining the opening of the lid and of holding it inclined in such a way that, if diskettes were stored in the box, they would not be presented in readable and accessible manner, nor could they be picked up for selection. But one interesting fact is that this box is less expensive than the aforesaid box.

The object of the present invention is to overcome the drawbacks of these two known containers, by regrouping their advantages and adding in others. Thus, some of their suitably selected means are regrouped and combined together as well as with novel means.

SUMMARY OF THE INVENTION

To this effect the box according to the invention comprises, similarly to the box according to French Pat. No. 2 456 671 U.S. Pat. No. 4,314,637 a body forming a receptacle for the diskettes and constituted by a base, side walls, a back upper part, and also, a lid constituted by a front upper part, side walls and a frontal part, the back and front upper parts being joined together by a continuous integral hinge, and the side walls of the body and of the lid being in mutual overlapping relation. Said box comprises, similarly to the box according to French Pat. No. 2 498 357, U.S. Pat. No. 4,449,628, means for keeping the lid open by resting it on the body. In this open position, the lid is tilted backwards with respect to the plane perpendicular to the bottom which traverses the hinge, so that, in this position, and when the box rests on a support by the opposite edges of the back of its body and of the top of its lid, the diskettes stored inside the receptacle are also tilted backwards.

According to a particularly advantageous embodiment of the invention, the means used for holding the lid in open position are constituted, in manner known per se, by at least one pin projecting indifferently, on one side of the lid or on one side of the body, and cooperating with a hole provided in the conjugated side, the considered side of the lid is provided with a portion extending rearwards beyond the hinge in order to present one of the locking elements (pin or hole), whereas the conjugated side of the body presents, in the front of the hinge, the other locking element (pin or lug), so that the fictitious line traversing the hinge and the locking element of the extension on the lid side, forms, with the front upper part of said lid, an obtuse angle (A) which, having deducted the acute angle (B) formed by the fictitious line traversing the hinge and the locking element on the body side with the base of said body, corresponds to the aforesaid inclination (C) of the lid.

Moreover, the edge of the hole or holes cooperating with the pin or pins when the box is closed, presents an inclined locking ramp for said pin or pins when the lid is pivotally opened.

BRIEF DESCRIPTION OF THE DRAWINGS

The invention more readily understood on reading the following description with reference to the accompanying drawings in which:

FIG. 1 is a perspective view showing the box according to the invention in an open displaying position;

FIG. 5 is a similar view to FIG. 1, illustrating the box molded in one piece, before assembly.

DESCRIPTION OF THE PREFERRED EMBODIMENT

Figure 2:
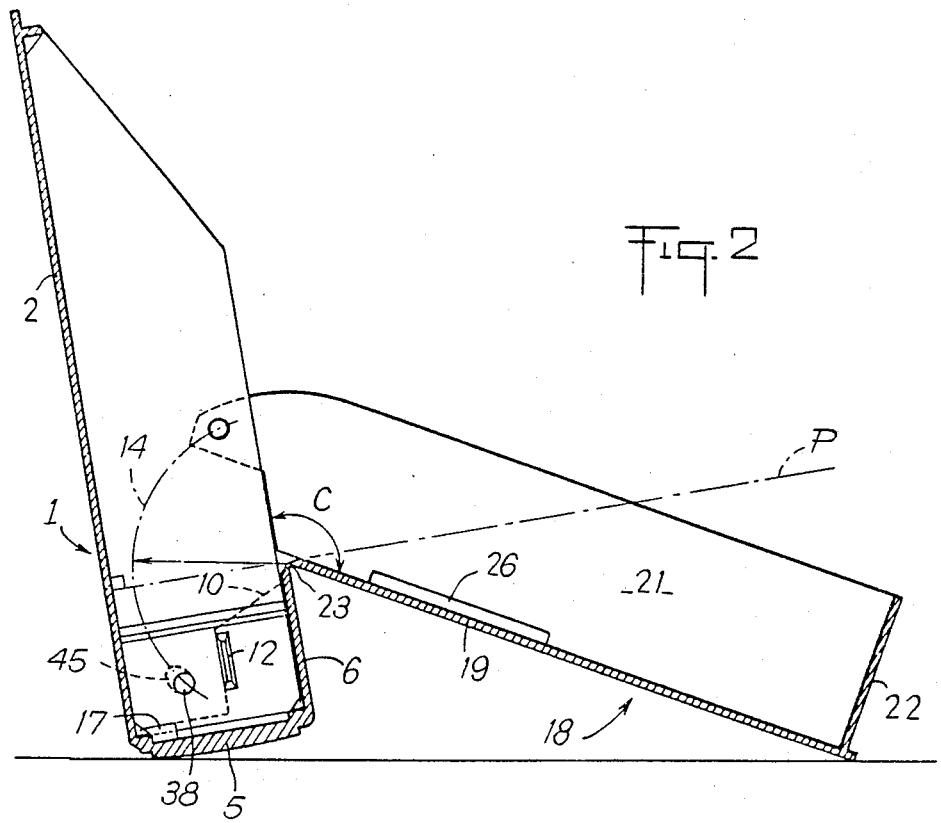
FIG. 2 is an anteroposterior section taken along line II—II of FIG. 1.

As illustrated in the figures, the box according to the invention comprises a body 1 constituted by a base 2, side walls 3 and 4, a back part 5 and a back upper part 6. When the box is closed and laid flat on a support, it rests on said support by its upper part (FIG. 4) or by its base 2.

Figure 3:
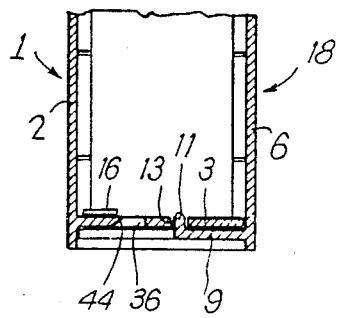
FIG. 3 is a partial cross-section taken along line III—III of FIG. 1, the box being closed.

All of said elements 2 to 6 are in plastic material and formed by substantially flat molding, as can be seen in FIG. 5. They are rigidly joined one to the other in order to form a receptacle 7 for housing the diskettes. To this effect, the back part 5 and the base 2 are pivotally joined together, by way of a continuous hinge 8 which, in actual fact, is constituted by a thinned down portion of the walls; moreover, said part 5 and the back upper part 6 are rigidly joined together by angle-brackets 9, 10 formed by molding; said brackets are provided with inwardly projecting locking teeth 11, 12 designed to cooperate with slots 13, 14 provided in side walls 3, 4 for assembling said angle-brackets 9, 10 against the side walls 3, 4 when, by pivoting about the continuous hinge 8, the back part 5 moves perpendicularly to the base 2; in this position, which is defined materially by triangular stops 15, the resulting assembly is locked by ribs 16, 17 which, during the aforesaid pivoting movement, engage into side walls 3 and 4, whereas the angle-brackets 9, 10 are positioned on the outside; assembly via teeth 11, 12 and slots 13, 14 is achieved by elastic deformation of the parts concerned 3,4,9 and 10 (FIG. 3).

The body 1, although being substantially flat-molded (FIG. 5), is monobloc and rigid after assembly (FIG. 1). It forms the receptacle designed to receive diskettes or other magnetic members and to keep them in stacked order.

According to FIGS. 1 and 5, the box further comprises a lid 18 constituted by a front upper part 19, side walls 20, 21 and a frontal part 22. All of said elements 19 to 22 are in plastic material, of the same material as used for the body, and they are formed by substantially flat-molding with said body in the same mold (FIG. 5).

The lid 18 is pivotally joined to said body 1, by way of a continuous hinge 23, which is in fact a thinned down portion of the upper parts 6 and 19.

When the box is closed (FIG. 4), the sides 20 and 21 of the lid 18 extend outwardly and against the sides 3 and 4 of the body 1; in like manner, the frontal part 22 of the lid fits over a ledge 24 joining together the base 2 and the side walls 3, of the body 1. Thus, in the closed position, the box is sealed and can protect adequately the diskettes contained therein against any foreign bodies such as dusts or the like; yet, to keep a perfect contacting hold on the sides 3, 4 and 20, 21, when the box is closed, the front upper part 19 is provided with ribs 25, 26 projecting inwardly of side walls 20, 21, the side walls 3 and 4 of the body being designed to engage over said elements 20 and 25, 21 and 26.

Figure 4:
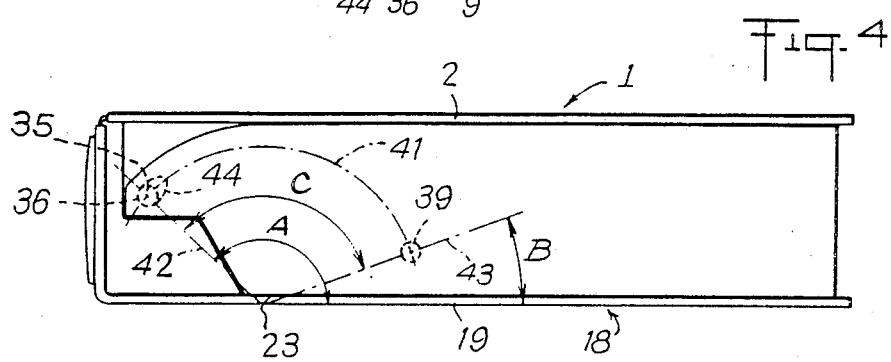
FIG. 4 is a side elevation of the box according to FIG. 1 which in this case is locked in the closed position.

As can be seen in FIG. 1, and more particularly in FIGS. 2 and 4, side walls 20 and 21 extend beyond the continuous hinge 23 and form extensions 27 and 28 respectively insertable, when the box is closed, in the angle-brackets 9, 10. Thus the upper edge 29, 30 of said extensions is broken to form an obtuse angle and their lower edge 31, 32 is arc-shaped concentrically to the hinge 23, said edges 29 and 31, 30 and 32 defining a tip 33, 34 advancing rearwardly of and beneath said hinge 23, when the box is closed.

The means for locking the box in the closed position is located in each one of said tips 33, 34. In the illustrated example, it is constituted, for the tip 33 of the lid, by a pin 35 projecting inwardly and adapted to cooperate with a hole 36 provided in side wall 3 of the body 1 and, for the tip 34 of said lid, by a pin 37 projecting inwardly and adapted to cooperate with a hole 38 provided in the side 4 of said body.

It is also possible with the same locking means to define the opening of the box, such as illustrated in FIGS. 1 and 2. In that position in which the box rests on a support, no longer by the top part 19 (or by the base 2) as when it is closed (FIG. 4), but by the opposite edges of the back part 5 and of the upper part 19 of its lid 18, said lid 18 is tilted back with respect to the plane p perpendicular to the base 2 and traversing the hinge 23, said base being presumed to be resting on the support as in the closed position. The front upper part 19 of the lid 18 forms with the base 2 of the body 1(or the upper edge of said walls 3, 4 parallel thereto) an obtuse angle C. Thus, the diskettes stored in the receptacle 2 to 6 are backed against said upper part 19 of the lid and tilted backwards so as to be easier to examine one by one.

The lugs 35 and 37 then cooperate with holes 39 and 40 provided in the side walls 3 and 4 of the body 1 ahead of the continuous hinge 23 and close to the upper edge of said side walls.

It should be noted that the holes 36 and 39 (FIG. 4) are perfectly defined one with respect to the other. They are situated at the same distance from the hinge 23, namely on an arc of circle 41 concentric thereto; moreover, the angle formed by their polar radii 42 and 43 is exactly equal to said opening angle C of the lid 18; in other words, the difference between angle A of polar radius 42 with respect to the upper part 19 of the closed lid and angle C of polar radius 43 with respect to the same upper part 19 is equal to the opening angle C.

To unlock the lid 18 from the open position, it suffices to bend manually by elastic deformation, the tips 33 and 34 in order to release the pins 35 and 37.

To unlock the lid 18 when this is closed, it suffices to detach it from the body 1 by forcing it forward; indeed, the holes 36 (FIG. 4) and 38 (FIG. 2) issue on the outside of walls 3 and 4 of the body 1 via inclined ramps 44 and 45 respectively, extending tangentially to the circular path 41 described by the pins 35 and 37 during opening; said inclined ramps 44 and 45 cause, when the lid is opened by force, the automatic release of said pins and unlocking.

Understandably, pins 35, 37 may be formed by projections on the outside of walls 3, 4 of the body 1, so that each one can cooperate with two holes provided in the extended side walls 20, 27 and 21, 28, said holes being angularly spaced apart with respect to the hinge 23, at an angle C.

Whatever the embodiment selected, it is not necessary for the locking pin in open position to be mistaken with the locking pin in closed position.

What is claimed is:

1. A box for the storage, display and selection of diskettes or other magnetic members comprising a body, a lid and means for holding said lid in an open position, said body including a base, a pair of side walls, a back part and a back upper part which together define a receptacle for receiving diskettes or other members, said lid including a front upper part, a pair of side walls and a frontal part, said front upper part of said lid being joined to said back upper part of said body by means of a continuous integral hinge, said side walls of said lid and said body being in mutual overlapping relation, said means for holding said lid in an open position being adapted to keep said lid open by resting said lid on said body such that said lid is tilted back so as to form a first obtuse angle with respect to the plane perpendicular to said base and traversing said hinge such that, in the open position and when the opposite edges of said back part of said body and said front upper part of said lid rest on a support surface, the diskettes or other members within said receptacle are also tilted back, said means for holding said lid in an open position includes at least one pin projecting from a side of said lid and at least one hole provided in the like side of said body, said pin being adapted to cooperate with said hole, said pin projecting from a rearwardly extending portion provided on said side of said lid, said rearwardly extending portion extending rearward beyond said hinge, said hole being provided on said side of said body in front of said hinge such that a fictitious line traversing said hinge and said pin forms a second obtuse angle with said front upper part of said lid, said second obtuse angle corresponding to said first obtuse angle when the acute angle formed by a fictitious line traversing said hinge and said hole with the base of said body is deducted.

2. A box for the storage, display and selection of diskettes or other magnetic members comprising a body, a lid and means for holding said lid in an open position, said body including a base, a pair of side walls, a back part and a back upper part which together define a receptacle for receiving diskettes or other members, said lid including a front upper part, a pair of said walls and a frontal part, said front upper part of said lid being joined to said back upper part of said body by means of a continuous integral hinge, said side walls of said lid and said body being in mutual overlapping relation, said means for holding said lid in an open position being adapted to keep said lid open by resting said lid on said body such that said lid is tilted back so as to form a first obtuse angle with respect to the plane perpendicular to said base and traversing said hinge such that, in the open position and when the opposite edges of said back part of said body and said front upper part of said lid rest on a support surface, the diskettes or other members within said receptacle are also tilted back, said means for holding said lid in an open position includes at least one pin projecting from a side of said body and at least one hole provided in the like side of said lid, said hole being provided in a rearwardly extending portion provided on said side of said lid, said rearwardly extending portion extending rearward beyond said hinge, said pin being provided on said side of said body in front of said hinge such that a fictitious line traversing said hinge and said hole forms a second obtuse angle with said front upper part of said lid, said second obtuse angle corresponding to said first obtuse angle when the acute angle formed by a fictitious line traversing said hinge and said pin with the base of said body is deducted.

3. A box for the storage, display and selection of diskettes or other magnetic members as recited in claim 1 wherein the edge of at least one other hole cooperating with said pin when said lid is in the closed position presents an inclined locking ramp for said pin when said lid is pivotally opened.

* * * * *